United States Patent [19]
Ottenstein

[11] Patent Number: 5,270,818
[45] Date of Patent: Dec. 14, 1993

[54] ARRANGEMENT FOR AUTOMATICALLY CONTROLLING BRIGHTNESS OF COCKPIT DISPLAYS

[75] Inventor: Jeremy Ottenstein, Jerusalem, Israel
[73] Assignee: AlliedSignal Inc., Morris Township, Morris County, N.J.
[21] Appl. No.: 946,994
[22] Filed: Sep. 17, 1992
[51] Int. Cl.$^5$ .......................... H04N 5/58; H04N 5/57
[52] U.S. Cl. .................................... 358/161; 358/168; 315/10
[58] Field of Search .............. 358/168, 161, 169, 69; 340/793; 315/10

[56] References Cited
U.S. PATENT DOCUMENTS

| | | | |
|---|---|---|---|
| 4,410,841 | 10/1983 | Dusard et al. | 358/161 |
| 4,564,856 | 1/1986 | Sanderson et al. | 358/168 |
| 4,707,739 | 11/1987 | Endo et al. | 358/168 |
| 5,057,744 | 10/1991 | Barbier et al. | 358/168 |

Primary Examiner—Mark R. Powell
Assistant Examiner—John W. Miller
Attorney, Agent, or Firm—Donald B. Paschburg; Howard G. Massung

[57] ABSTRACT

An automatic brightness control provides automatic compensation for the effects of ambient light on a display. A microprocessor interfaced to ambient light sensors, pilot selected brightness controls and a harmonization gain potentiometer, implements a control program and outputs a raster gain signal. A video signal is multiplied with the raster gain signal therefore producing a cathode voltage that provides the automatic compensation.

11 Claims, 1 Drawing Sheet

NOTES: 1. THE ⊠ MULTIPLIES TWO SIGNAL TOGETHER.
2. THE ▷ ACTS AS A GATE, SAVING THE PREVIOUS VALUE WHEN DISABLED.

ARRANGEMENT FOR AUTOMATICALLY CONTROLLING BRIGHTNESS OF COCKPIT DISPLAYS

BACKGROUND OF THE INVENTION

1. Field of the Invention

The present invention relates to cockpit displays and more particularly to automatic adjustment of the brightness of cockpit displays.

2. Description of the Prior Art

There are several systems available which control brightness of video instruments. One such system is disclosed in U.S. Pat. No. 4,589,022 to Prince, J. S. et al titled "Brightness Control System for CRT Video Display". The control system includes a buffer amplifier for receiving high speed video information, a gain control variable resistor serving as a contrast control, an ambient light sensor for driving a nonlinear amplifier to provide an ambient light signal, and a manual brightness control potentiometer which is adjustable to provide a constant brightness signal. The video information signal, the ambient light signal, and the manual brightness control signal are added together by a summing device. An exponential transfer function then transforms the resulting signal into brightness levels compatible with human eye brightness detection.

The present invention differs from the prior art in that it seeks to use the ambient light signal to maintain a constant contrast (actually extrinsic contrast) despite changing ambient light conditions. In addition, the present invention is independent of a specific hardware implementation and is applicable to a wide variety of CRTs, and even non-CRT displays including Heads Up Displays (HUDs).

SUMMARY OF THE INVENTION

The present invention discloses an automatic brightness control that provides automatic compensation for the effects of sunlight on an avionics cockpit display. The present invention was implemented for the following specific display which is referred to below as the target display:

1. The display is a multi-function display (MFD) unit i.e., it is designed to display a variety of graphics and textual information in both stroke and raster.
2. The display is a CRT (cathode ray tube) type display.
3. The display has a selectable auto mode versus manual mode switch. When auto mode is selected, automatic brightness control is engaged. In manual mode the pilot manually maintains the brightness settings.
4. The display has three rocker switches allowing the operator to control separately symbol (stroke) brightness, raster brightness and overall brightness.
5. The display has two ambient light sensors embedded in the bezel around the face of the display.
6 The display has an embedded microprocessor capable of interfacing with the above sensors, various analog inputs and outputs, and implementing a control algorithm.

The present invention could be implemented to automatically control brightness on other MFDs or even an HUD (Heads Up Display). Also, a selectable auto mode versus manual mode switch is not necessary as the present invention would work perfectly if permanently in auto mode.

DETAILED DESCRIPTION OF THE INVENTION

Figure 1:
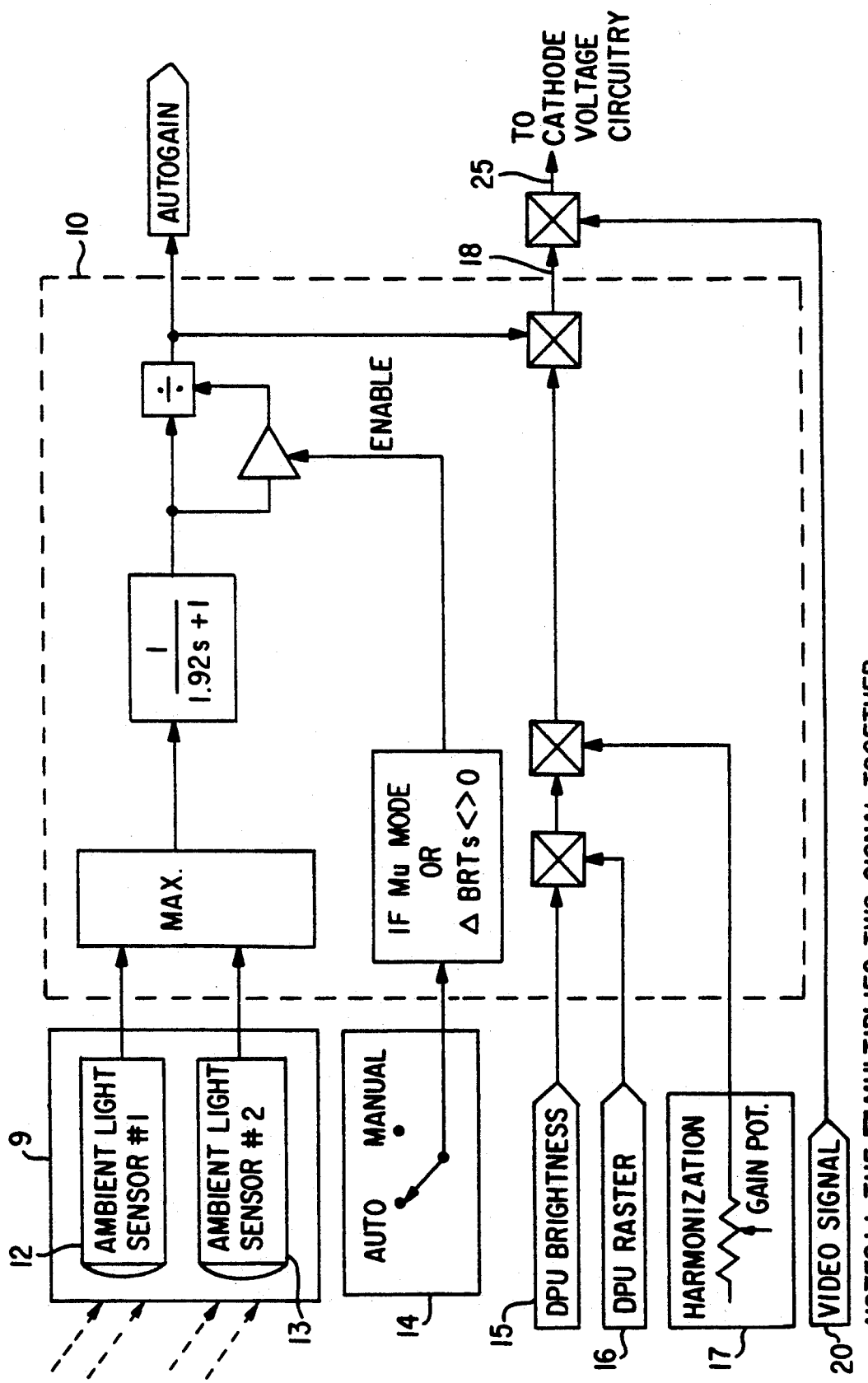
FIG. 1 illustrates a control diagram of the preferred embodiment of the present invention embedded in a target display.

A multifunction display unit mounted in a cockpit is required to display distinct video images against a wide range of ambient lighting. High levels of ambient light (sunlight) tend to obscure the display images. The present invention provides a control which automatically adjusts the display brightness, increasing the display brightness for increasing levels of ambient brightness and decreasing the display brightness for decreasing levels of ambient brightness.

As shown in FIG. 1, the present invention utilizes microprocessor 10 that interfaces with two ambient light sensors 12, 13 embedded in the bezel around the face of a display designated by the numeral 9. Microprocessor 10 also interfaces with selectable auto mode/manual mode switch 14 and two pilot selected brightness settings, DPU Brightness (BRT) 15 and DPU Raster 16. The auto mode of auto mode/manual mode switch 14 enables the operation of the automatic brightness control and the manual mode disables it. There are three rocker switches on the display 9 which control symbol brightness, raster brightness and overall brightness. The symbol brightness together with overall brightness controls the intensity of the stroke image and the raster brightness together with the overall brightness controls the intensity of the raster image on the screen. Since the automatic brightness control is repeated for both the stoke and raster circuitry, only one implementation need be described. FIG. 1 shows the automatic brightness control for raster video and, therefore, the two relevant pilot selected brightness levels produced from their corresponding rocker switches: raster brightness and overall brightness. Note: raster brightness and overall brightness shall be known hereafter as DPU Raster and DPU Brightness.

Also, interfacing with microprocessor 10 is harmonization gain pot 17 (a potentiometer used to calibrate the cathode voltage at the manufacturing site). Video signal 20 does not interface with the microprocessor but is sent directly to the analog circuitry of the display where it is multiplied with raster gain 18 (also known as output brightness) output by the microprocessor and then used to produce cathode voltage 25.

The essence of the invention is the concept of varying the foreground brightness in direct proportion to the ratio of ambient light levels, in order to maintain constant extrinsic contrast.

Theory of the Invention

For purpose of this description, contrast can be defined as $(F-B)/B$, where F is foreground brightness and B is background brightness. This is also known as intrinsic contrast.

A realistic contrast calculation has to consider the effects of ambient light reflected off the surface of the screen. If A is the reflected ambient brightness, then the foreground and background brightness are both increased by A. In particular, if we define the extrinsic contrast to be $(F'-B')/B'$, where F' and B' are the foreground and background brightness adjusted for the effects of ambient light, then:

$$\frac{F' - B'}{B'} = \frac{(F + A) - (B + A)}{B + A} = \frac{F - B}{B + A}$$

Thus, the extrinsic contrast is $(F-B)/(B+A)$.

A typical brightness control may vary the foreground brightness, which is sometimes confusingly called a contrast control, while leaving the background brightness almost completely dark in the absence of ambient light. Thus we evaluate $(F-B)/(B+A)$, with $B=0$, to obtain $F/A$. So contrast is $F/A$. (Obviously, we mean extrinsic contrast, however, we will simply refer to it below as contrast.)

The auto brightness control of the present invention is designed to automatically adjust brightness to maintain a constant contrast over changes in the reflected ambient light. However, the contrast should vary when the pilot adjusts the brightness controls. So the constant contrast may be defined as:

$$c = FO/AO,$$

where FO and AO are the foreground brightness level and ambient brightness levels, respectively, 'latched' at the last time the brightness rocker switches were operated. At all other times, $F/A$ should equal $c=FO/AO$ or $F=FO*(A/AO)$.

In the present implementation F0=(DPU Brightness)*(DPU Raster)*(Harmonized Gain) thus, F=(DPU Brightness)*(DPU Raster)*(Harmonized Gain)* (A/A0), where F and A are the current values of foreground brightness and ambient brightness, respectively.

Or in Programming Design Language, it may be expressed as:

```
If (Rocker Switches depressed) or Not (Auto mode)
or (Power just turned on) then
  AO: = A;
End if;
F: = (DPU Brightness)*(DPU Raster)*
(Harmonized Gain)*(A/AO);
```

Note when the rocker switches are depressed or when the display is in manual mode, F is just the product of DPU Brightness, DPU Raster and Harmonized Gain.

Implementation Details

As already stated, the above formulas are an implementation of the automatic brightness control for raster video. The identical formulas are valid for stroke videos with the input signal, DPU Raster, replaced by DPU Symbol.

The formulas use A to represent either the ambient light level or the reflected ambient light, and do not distinguish between them. This is not correct. Moreover, the amount of ambient light reflected off the face of the screen is not readily available. Since, however, it differs from the sensed ambient light by only a constant gain, this gain may be ignored from the formula for output brightness. This is readily shown by realizing that output brightness, F, is a function not of the reflected ambient brightness level, but of the ratio between two reflected ambient light levels.

The expression (F/A) for contrast grows without limit as A approaches zero. Further for very low ambient light levels, a night mode should be used in place of auto mode. Thus the automatic brightness control need not and should not operate at low ambient light levels, say less than 10% of maximum. The sensed ambient brightness level should be limited so that it is always at least 10% of full scale.

The ambient light sensor should be sampled at 10 Hz. The light sensor output should be filtered to prevent the display from responding too quickly to changes in ambient light level and flashing. A first order, linear lag with a time constant of 1.92 seconds should be sufficient.

The automatic brightness control of the present invention maintains a constant extrinsic contrast over varying reflected ambient light levels for any particular pilot selected brightness settings. The output brightness will not change when transitioning from manual mode to auto mode; but will only respond to changes in the reflected ambient light, increasing or decreasing the output brightness to make the contrast match the last pilot selected contrast.

This auto brightness control of the present invention provides the following benefits. (1) The display contrast remains constant over varying ambient brightness (2) The display brightness can be controlled by the operator in Auto mode for any fixed level of ambient brightness. (3) More specifically, the display contrast is selectable by the operator, and the last operator selected contrast will be maintained over varying ambient brightness. (4) The display brightness is not reduced by selecting Auto mode. (5) The full range of ambient brightness is supported, from 500 to 4000 Foot-lamberts. (6) Automatic brightness adjustments occur smoothly (without flashing).

It is not intended that this invention be limited to the hardware or software arrangement, or operational procedures shown disclosed. This invention includes all of the alterations and variations thereto as encompassed within the scope of the claims as follows.

I claim:

1. An automatic brightness control comprising:
  ambient light sensor means located on a display for monitoring ambient light;
  user selected brightness settings for controlling raster brightness and overall brightness of the display;
  harmonization gain potentiometer means for calibrating cathode voltage of said display;
  microprocessor means interfacing with said ambient light sensor means, said user selected brightness settings and said harmonization gain potentiometer means for implementing a control algorithm and for providing a raster gain signal;
  selectable auto mode/manual mode switch means interfacing to said microprocessor means; and
  video signal means that is multiplied with said raster gain signal for producing cathode voltage that provides automatic compensation for effects of said ambient light.

2. An automatic brightness control as claimed in claim 1 wherein said ambient light sensor means comprises two ambient light sensors.

3. An automatic brightness control as claimed in claim 1 wherein said ambient light sensor means comprises a plurality of ambient light sensors.

4. An automatic brightness control comprising:
  a display;
  ambient light sensor means located on said display for monitoring ambient light;
  user selected brightness settings for controlling rater brightness and overall brightness of the display;

microprocessor means interfacing with said ambient light sensor means and said display for implementing a control algorithm and for providing a raster gain signal;

selectable auto mode/manual mode switch means interfacing to said microprocessor means; and video signal means that is multiplied with said raster gain signal for producing cathode voltage that provides automatic compensation for effects of said ambient light.

5. An automatic brightness control as claimed in claim 4 wherein said display is a multi-function display (MFD) designed to display a variety of graphics and textual information in both stroke and raster.

6. An automatic brightness control as claimed in claim 4 wherein said display is a cathode ray tube.

7. An automatic brightness control as claimed in n claim 4 wherein said display is a heads up display (HUD).

8. An automatic brightness control as claimed in claim 4 wherein said ambient light sensor means comprises two ambient light sensors.

9. An automatic brightness control as claimed in claim 8 wherein said two ambient light sensors are sampled at a ratio of 10 Hz.

10. An automatic brightness control as claimed in claim 8 wherein said two ambient light sensors are filtered to prevent said display from responding too quickly to changes in ambient light level and flashing.

11. An automatic brightness control as claimed in claim 4 further comprising pilot selected brightness settings interfacing to said microprocessor means.

* * * * *